US012193108B2

(12) United States Patent
Sapra et al.

(10) Patent No.: US 12,193,108 B2
(45) Date of Patent: Jan. 7, 2025

(54) METHODS, SYSTEMS, AND COMPUTER READABLE MEDIA FOR IDENTIFYING ROAMING MESSAGES

(71) Applicant: Oracle International Corporation, Redwood Shores, CA (US)

(72) Inventors: Kawal Sapra, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 341 days.

(21) Appl. No.: 17/725,499

(22) Filed: Apr. 20, 2022

(65) Prior Publication Data
US 2023/0345223 A1      Oct. 26, 2023

(51) Int. Cl.
*H04W 8/02*         (2009.01)
(52) U.S. Cl.
CPC ................... *H04W 8/02* (2013.01)
(58) Field of Classification Search
CPC ..................................... H04W 8/02
USPC ..................................... 455/432.1
See application file for complete search history.

(56) References Cited

U.S. PATENT DOCUMENTS

2022/0417204 A1* 12/2022 Rajput ............... H04W 8/00

FOREIGN PATENT DOCUMENTS

WO   WO-2022033662 A1 * 2/2022

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).
"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

* cited by examiner

*Primary Examiner* — Ted M Wang
(74) *Attorney, Agent, or Firm* — Jenkins, Taylor & Hunt, P.A.

(57) ABSTRACT

Methods, systems, and computer readable media for identifying roaming messages at network functions in a home public land mobile network (PLMN). A method includes receiving, at a home security edge protection proxy (SEPP) for the home PLMN, a request message from a consumer network function in a visitor PLMN and adding, at the home SEPP, a header to the request message indicating that the request message originated in the visitor PLMN. The method includes receiving, at a producer network function in the home PLMN, the request message and determining, at the producer network function, that the request message originated in the visitor PLMN by finding the header indicating that the request message originated in the visitor PLMN. The method includes applying, at the producer network function, a roaming-specific policy while processing the request message in response to determining that the request message originated in the visitor PLMN.

20 Claims, 5 Drawing Sheets

METHODS, SYSTEMS, AND COMPUTER READABLE MEDIA FOR IDENTIFYING ROAMING MESSAGES

TECHNICAL FIELD

The subject matter described herein relates to telecommunications networks. More particularly, the subject matter described herein relates to methods, systems, and computer readable media for identifying roaming messages at network functions in a home public land mobile network (PLMN).

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service. An NF instance is an instance of a producer NF that provides a service. A given producer NF may include more than one NF instance.

Producer NFs register with a network function repository function (NRF). The NRF maintains service profiles of available NF instances identifying the services supported by each NF instance. Consumer NFs can subscribe to receive information about producer NF instances that have registered with the NRF.

During third generation partnership project (3GPP) deployments, operators can define different security policies for the messages originated in same PLMN network and different for the message originated from different PLMN (roaming use-cases). Similarly, observabilities requirements (metrics, KPIs, tracing, alerts, logging) can also be different to troubleshoot/maintain the deployments in the better way. There is no clear mechanism defined in 3GPP to enable producer network functions to identify whether messages are coming from the home SEPP (in the case of inter-PLMN use-cases) or the messages are coming from the consumer network functions which are deployed in the same PLMN of the producer network functions.

In light of these and other difficulties, there exists a need for methods, systems, and computer readable media for identifying roaming messages at network functions in a home public land mobile network (PLMN).

SUMMARY

Methods, systems, and computer readable media for identifying roaming messages at network functions in a home public land mobile network (PLMN). A method includes receiving, at a home security edge protection proxy (SEPP) for the home PLMN, a request message from a consumer network function in a visitor PLMN and adding, at the home SEPP, a header to the request message indicating that the request message originated in the visitor PLMN. The method includes receiving, at a producer network function in the home PLMN, the request message and determining, at the producer network function, that the request message originated in the visitor PLMN by finding the header indicating that the request message originated in the visitor PLMN. The method includes applying, at the producer network function, a roaming-specific policy while processing the request message in response to determining that the request message originated in the visitor PLMN.

According to another aspect of the subject matter described herein, receiving the request message from the consumer network function in the visitor PLMN comprises receiving the request message by way of a visitor SEPP for the visitor PLMN.

According to another aspect of the subject matter described herein, applying a roaming-specific policy while processing the request message comprises applying a roaming-specific security policy.

According to another aspect of the subject matter described herein, applying a roaming-specific policy while processing the request message comprises applying a roaming-specific observability policy.

According to another aspect of the subject matter described herein, the method includes sending, at the producer network function in the home PLMN, a response message to the consumer network function in the visitor PLMN by way of the home SEPP.

According to another aspect of the subject matter described herein, the producer network function comprises a network function repository function (NRF), and the request message comprises a NRF NFStatusSubscribe message or a NRF NFStatusUnsubscribe message.

According to another aspect of the subject matter described herein, the producer network function comprises a network function repository function (NRF), and wherein the request message comprises a NRF NF Discover message.

According to another aspect of the subject matter described herein, a system for identifying roaming messages at network functions in a home public land mobile network (PLMN) comprises a home security edge protection proxy (SEPP) for the home PLMN. The SEPP can be implemented on a system of one or more processors and memory storing instructions for the processors. The SEPP is configured for receiving a request message from a consumer network function in a visitor PLMN and adding a header to the request message indicating that the request message originated in the visitor PLMN.

The system includes a producer network function in the home PLMN. The producer network function can be implemented on a system of one or more processors and memory storing instructions for the processors. The producer network function is configured for receiving the request message and determining that the request message originated in the visitor PLMN by finding the header indicating that the request message originated in the visitor PLMN. The producer network function is configured for applying a roaming-specific policy while processing the request message in response to determining that the request message originated in the visitor PLMN.

According to another aspect of the subject matter described herein, receiving the request message from the consumer network function in the visitor PLMN comprises receiving the request message by way of a visitor SEPP for the visitor PLMN.

According to another aspect of the subject matter described herein, applying a roaming-specific policy while processing the request message comprises applying a roaming-specific security policy.

According to another aspect of the subject matter described herein, applying a roaming-specific policy while processing the request message comprises applying a roaming-specific observability policy.

According to another aspect of the subject matter described herein, the producer network function in the home PLMN is configured for sending a response message to the consumer network function in the visitor PLMN by way of the home SEPP.

According to another aspect of the subject matter described herein, the producer network function comprises a network function repository function (NRF), and the request message comprises a NRF NFStatusSubscribe message or a NRF NFStatusUnsubscribe message.

According to another aspect of the subject matter described herein, the producer network function comprises a network function repository function (NRF), and the request message comprises a NRF NF Discover message.

According to another aspect of the subject matter described herein, one or more non-transitory computer readable media have stored thereon executable instructions that when executed by at least one processor of a computer cause the computer to perform steps comprising receiving, at a home security edge protection proxy (SEPP) for a home public land mobile network (PLMN), a request message from a consumer network function in a visitor PLMN; adding, at the home SEPP, a header to the request message indicating that the request message originated in the visitor PLMN; receiving, at a producer network function in the home PLMN, the request message; determining, at the producer network function in the home PLMN, that the request message originated in the visitor PLMN by finding the header indicating that the request message originated in the visitor PLMN; and applying, at the producer network function in the home PLMN, a roaming-specific policy while processing the request message in response to determining that the request message originated in the visitor PLMN.

According to another aspect of the subject matter described herein, receiving the request message from the consumer network function in the visitor PLMN comprises receiving the request message by way of a visitor SEPP for the visitor PLMN.

According to another aspect of the subject matter described herein, applying a roaming-specific policy while processing the request message comprises applying a roaming-specific security policy.

According to another aspect of the subject matter described herein, applying a roaming-specific policy while processing the request message comprises applying a roaming-specific observability policy.

According to another aspect of the subject matter described herein, the producer network function comprises a network function repository function (NRF), and the request message comprises a NRF NFStatusSubscribe message or a NRF NFStatusUnsubscribe message.

According to another aspect of the subject matter described herein, the producer network function comprises a network function repository function (NRF), and wherein the request message comprises a NRF NF Discover message The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for identifying 5G roaming messages at network functions in a home public land mobile network (PLMN).

In order to serve subscribers which are roaming in non-home PLMN networks, network functions in visitor networks perform 3GPP defined service operations towards network functions deployed in the home networks of those subscribers. The corresponding messages are communicated by way of the visitor SEPP and home SEPP network functions. These use-cases are also known as service operation for roaming.

During 3GPP deployments, operators can define different security policies for the messages originated in same PLMN network and different for the message originated from different PLMN (roaming use-cases). Similarly, observabilities requirements (metrics, KPIs, tracing, alerts, logging) can also be different to troubleshoot/maintain the deployments in the better way.

There is no clear mechanism defined in 3GPP to enable producer network functions to identify whether messages are coming from the home SEPP in case of inter-PLMN use-cases or the messages are coming from the consumer network functions which are deployed in the same PLMN of producer network function itself. This document describes a proposed solution that introduces an identification which is added by a home SEPP in the form of the header which can indicate to the producer network functions that messages are coming from the home SEPP and they are roaming-specific messages.

On the basis of identification of roaming messages, network functions can execute the security related validations and policies required specially for roaming messages as well as observability related message processing required to troubleshoot the system. The proposed solution is compatible with existing 3GPP mechanisms.

Figure 1:
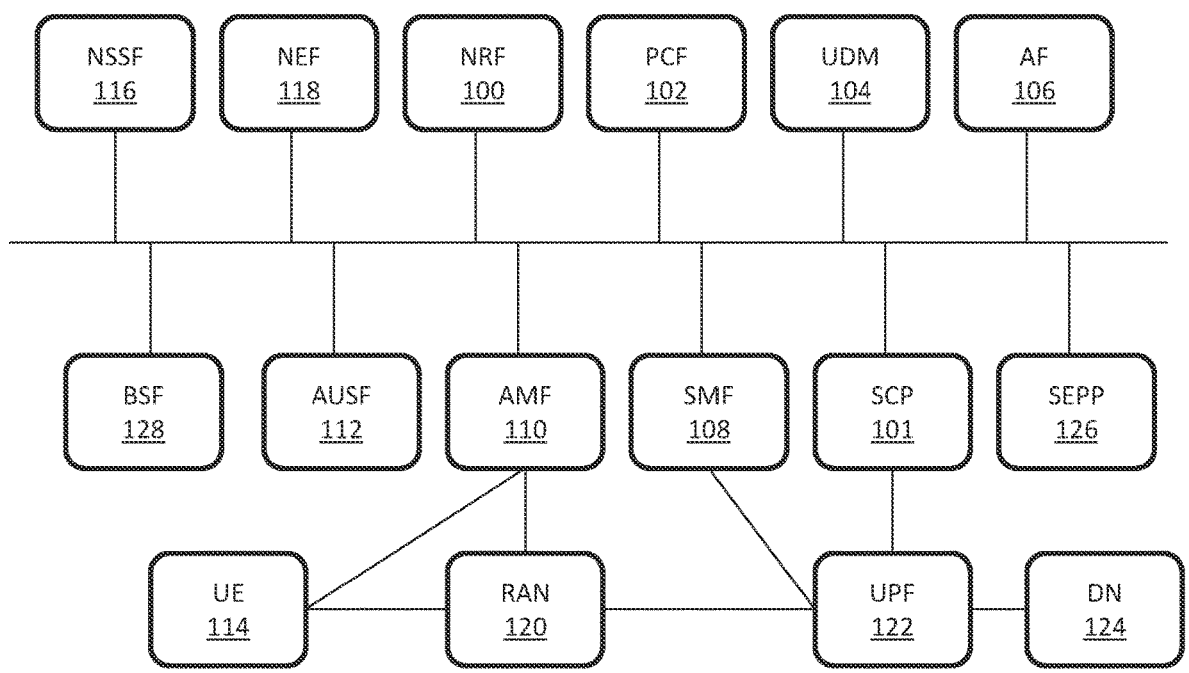
FIG. 1 is a block diagram illustrating an example 5G system network architecture.

FIG. 1 is a block diagram illustrating an example 5G system network architecture. The architecture in FIG. 1 includes network function repository function (NRF) 100 and service control proxy (SCP) 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP can obtain the NF or service profile or the producer NF instance from NRF 100. The NF or service profile can be a JavaScript object notation (JSON) data structure as defined in the $3^{rd}$ Generation Partnership Project (3GPP) Technical Specification (TS) 29.510.

In FIG. 1, network nodes can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. An authentication server function (AUSF) 112 performs authentication services for user equipment (UEs), such as user equipment (UE) 114, seeking access to the network.

AMF 110 performs mobility management operations similar to those performed by a mobility management entity (MME) in 4G networks. AMF 110 can perform, e.g., registration management, reachability management, connection management, and mobility management.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 is the network node used to protect control plane traffic that is exchanged between different 5G public land mobile networks (PLMNs). As such, SEPP 126 performs message filtering, policing and topology hiding for application programming interface (API) messages.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between NFs in different PLMNs may traverse two SEPP functions, one for the home PLMN and the other for the visitor PLMN.

A network slice selection function (NSSF) 116 provides network slicing services for devices seeking to access specific network capabilities and characteristics associated with a network slice. Network slices enable users to select customized networks with different functionality (e.g., mobility) and/or performance requirements (e.g., latency, availability, reliability).

BSF 128 allows PCF 102 to register, update, and remove binding information from it, and BSF 128 allows NF consumers to discover the selected PCF. BSF 128 stores the binding information for certain PDU sessions and discovers the selected PCF according to the binding information.

In order to serve subscribers that are roaming in a visitor network, visitor network functions perform 3GPP defined service operations towards network functions deployed in the home networks of subscribers. Performing 3GPP defined service operations towards home networks typically happens through a visitor SEPP and a home SEPP. These use cases are also known as service operations for roaming.

During 3GPP deployments, operators can define different security policies for the messages originated in same PLMN network and different for the messages originated from different PLMNs (roaming use-cases). Similarly, observabilities requirements (metrics, KPIs, tracing, alerts, logging) can also be different to troubleshoot/maintain the deployments in a better way.

There is no clear mechanism defined in 3GPP to enable producer network functions to identify whether messages are coming from the home SEPP in case of inter-PLMN use-cases or the messages are coming from the consumer network functions which are deployed in the same PLMN of producer network function itself.

For 3GPP defined operations, subsequent messages have minimal information which may not be sufficient to determine that the messages should be classified as roaming or non-roaming messages. For example, consider service operations such as NRF NFStatusSubscribe for updates and NFStatusUnsubscribe. The incoming messages for such service operations may only include subscriptionId to identify the subscriber without specifying whether the subscriber is roaming or in the home network. Therefore, based on the subscriptionId alone, the NRF is not able to distinguish whether that particular service operation belongs to a roaming or a non-roaming use-case.

For another example, consider service operations such as the NRF NF Discover service operation, where the attributes that are available to identify the messages are specific to roaming or non-roaming use-cases, but this identification happens late in the process, such as after validating the presence of the specific attributes and their values. Until the identification of roaming and non-roaming messages happens, producer network functions can't apply different security policies for roaming and non-roaming messages. Moreover, in some cases, observabilities requirements can also not be applied or not be applied until it is too late in the process.

Another option is to configured SEPP 126 to add its host details to incoming roaming messages via an existing header. This option, however, may not be useful for the purpose of identifying roaming messages at producer network functions because the producer network functions would then need to be configured with SEPP details for any SEPPs deployed in the network. The producer network functions would need to have the SEPP host details pre-stored, e.g., as static data, so that producer network functions could compare the details in incoming messages to the SEPP host details to determine whether the incoming messages are roaming messages or not.

Figure 2:
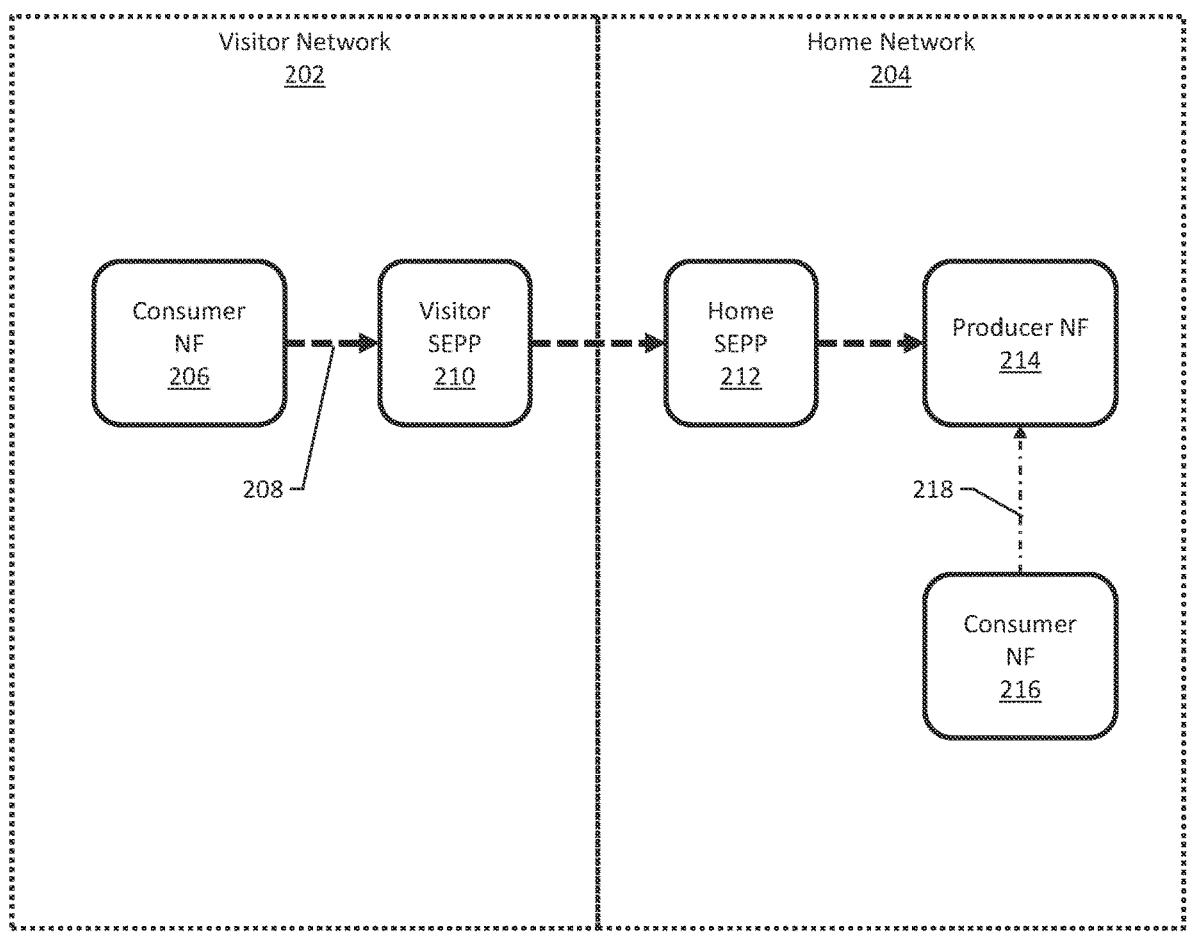
FIG. 2 is a block diagram illustrating a visitor network and a home network.

FIG. 2 is a block diagram illustrating a visitor network 202 and a home network 204. The network functions illustrated in FIG. 2 can each be implemented on a system of one or more processors and memory storing instructions for the processors.

Visitor network 202 includes at least one consumer network function 206 operating in a roaming scenario. Consumer network function 206 sends a request message 208 which is destined for home network 204.

Visitor SEPP 210 receives request message 208. Visitor SEPP 210 provides the request message to home SEPP 212. Home SEPP 212 provides the request message to a producer network function 214 that processes the request message. The producer network function 214 can be any appropriate producer network function, e.g., an NRF. In that case, the request message 208 can be, for example, a NRF NFStatusSubscribe message, a NRF NFStatusUnsubscribe message, or a NRF NF Discover message.

Producer network function 214 also receives request messages from consumer network functions within home network 204. For example, consumer network function 216 may send a request message 218 to producer network function 214.

Suppose that producer network function 214 is configured for applying roaming-specific security policies or observability policies to request messages 208 and 218. Producer network function 214 then needs to be configured to determine that request message 208 originated in visitor network 202 and that request message 218 originated in home network 204.

This document describes a solution to this problem by introducing an identification which is added by home SEPP 212 in the form of a header that can indicate to producer network function 214 (and other producer network functions) that messages are coming from home SEPP 212 and they are roaming messages. Producer network functions can then readily identify roaming messages by inspecting incoming messages for the presence of the header.

Based on identifying messages as roaming messages or non-roaming messages, producer network functions can execute security-related validations and policies required specifically for roaming messages as well as observability-related message processing required to troubleshoot the system. This solution is compatible with current 3GPP message processing.

Figure 3:
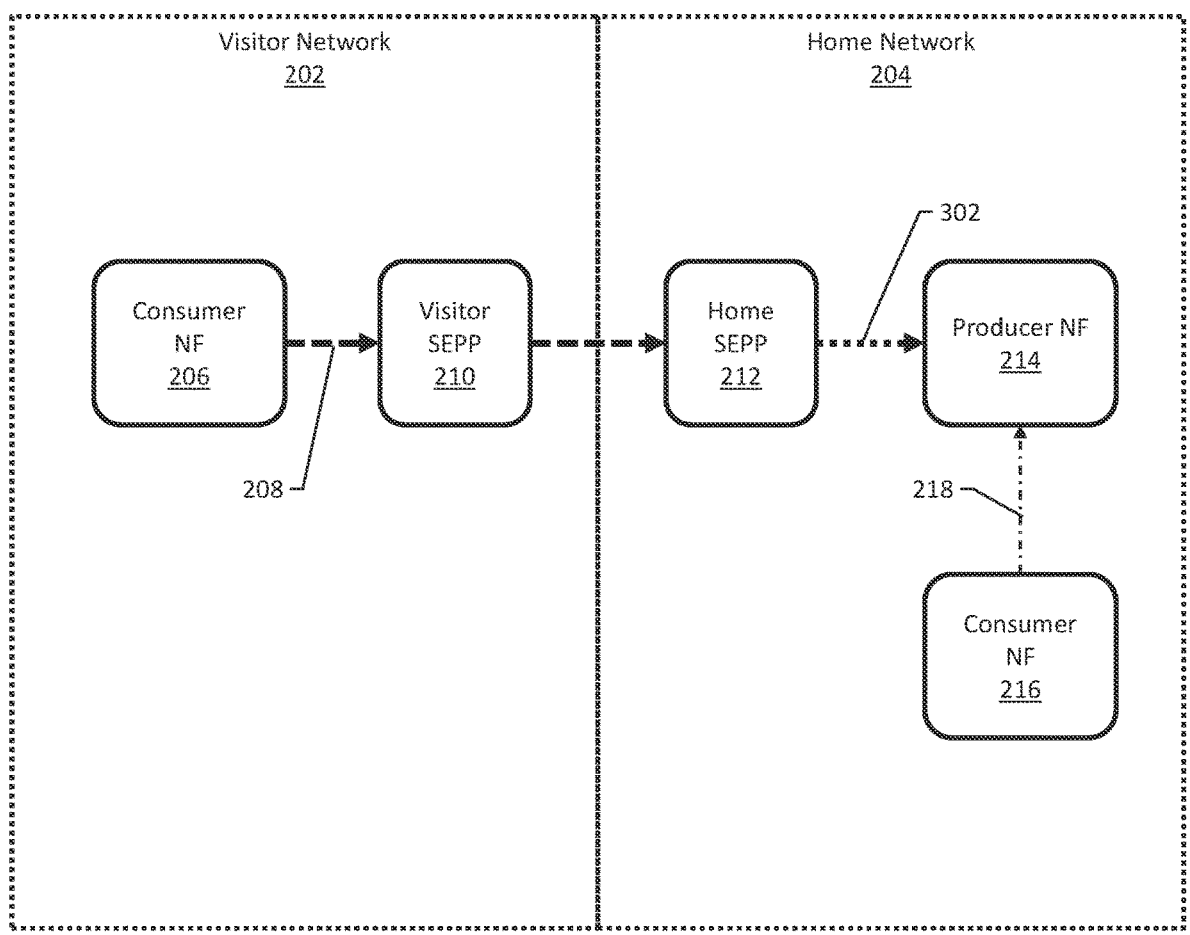
FIG. 3 is a block diagram illustrating the use of the message header for identifying roaming messages.

FIG. 3 is a block diagram illustrating the use of the message header for identifying roaming messages. FIG. 3 shows a visitor network 202 and a home network 204. The network functions illustrated in FIG. 2 can each be implemented on a system of one or more processors and memory storing instructions for the processors.

Visitor network 202 includes at least one consumer network function 206 operating in a roaming scenario. Consumer network function 206 sends a request message 208 which is destined for home network 204.

Visitor SEPP 210 receives request message 208. Visitor SEPP 210 provides the request message to home SEPP 212. Home SEPP 212 provides the request message to a producer network function 214 that processes the request message. The producer network function 214 can be any appropriate producer network function, e.g., an NRF. In that case, the request message 208 can be, for example, a NRF NFStatusSubscribe message, a NRF NFStatusUnsubscribe message, or a NRF NF Discover message.

Home SEPP 212 also adds a header 302 to request message 208 to indicate that request message 208 originated in visitor network 202. Header 302 can be any appropriate type of data to indicate that request message 208 is a roaming message. For example, header 302 can be a simple Boolean value. Header 302 can be located at any appropriate location within the request message 208.

Header 302 can be a hypertext transfer protocol (HTTP) header as specified in 3GPP TS 29.500. 3GPP TS 29.500 specifies HTTP standard headers and HTTP custom headers.

Producer network function 214 inspects request message 208 and finds the presence of header 302 and determines that request message 208 is a roaming message. Producer network function 214 then applies a roaming-specific security policy or a roaming-specific observability policy to the request message 208.

The roaming-specific policies may be specified by a network operator for home network 204. The network operator can specify the roaming-specific policies, e.g., when deploying producer network function 214. For example, a roaming-specific security policy may be more stringent for roaming messages than for request messages originated in home network 204. A roaming-specific security policy may include one or more additional security checks compared to a non-roaming security policy.

Similarly, observabilities requirements (metrics, KPIs, tracing, alerts, logging) can also be different to troubleshoot/maintain home network 204 for roaming scenarios. For example, a roaming-specific observability requirement may be more comprehensive for roaming messages then for request messages originated in home network 204. A roaming-specific observability requirement may specify collection of one or more additional metrics, KPIs, traces, alerts, or logs compared to a non-roaming observability policy.

Producer network function 214 also receives request messages from consumer network functions within home network 204. For example, consumer network function 216 may send a request message 218 to producer network function 214.

Producer network function 214 inspects request message 218 and finds that a header indicating that request message 218 is a roaming message is absent. In response, producer network function 214 determines that request message 218 is a non-roaming message. Producer network function 214 does not apply any roaming-specific security or observability policies specified by the network operator to request message 218.

Figure 4:
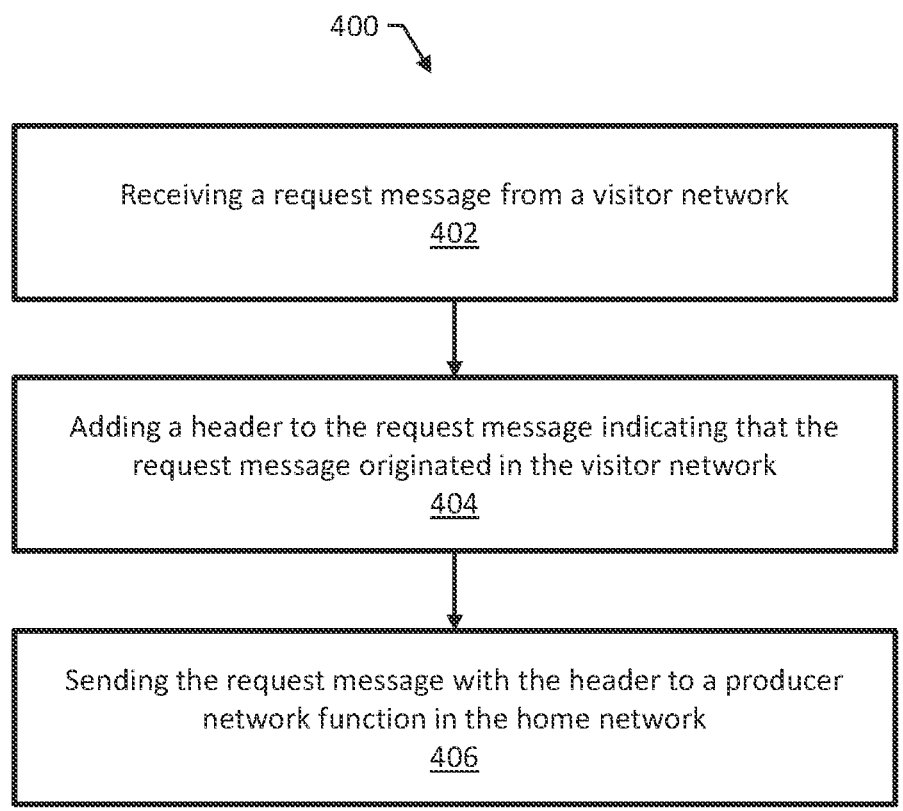
FIG. 4 is a flow diagram of an example method for enabling identification of 5G roaming messages at network functions in a home PLMN.

This solution may provide one or more of the following benefits:
- Early identification of roaming and non-roaming messages at network functions in the home PLMN network
- Improved security handling and policy which producer network functions can define specially for roaming messages.
- Improved troubleshooting for roaming-based messages
- Early identification of messages based on different use-cases provides better control to the network functions.
- Compatibility with 3GPP defined operations FIG. 4 is a flow diagram of an example method 400 for enabling identification of 5G roaming messages at network functions in a home PLMN. Method 400 is performed by a home SEPP.

Method 400 includes receiving a request message from a consumer network function in a visitor PLMN (402). The request message is typically received by way of a visitor SEPP in the visitor PLMN. The request message can be, for example, a NRF NFStatusSubscribe message, a NRF NFStatusUnsubscribe message, or a NRF NF Discover message.

Method 400 includes adding a header to the request message indicating that the request message originated in the visitor PLMN (404). Adding a header includes, generally, adding some data to the request message, in any appropriate location within the request message, to indicate that the request message originated in the visitor PLMN.

Method 400 includes sending the request message with the header to a producer network function in the home network (406). The producer network function can be, for example, an NRF.

Figure 5:
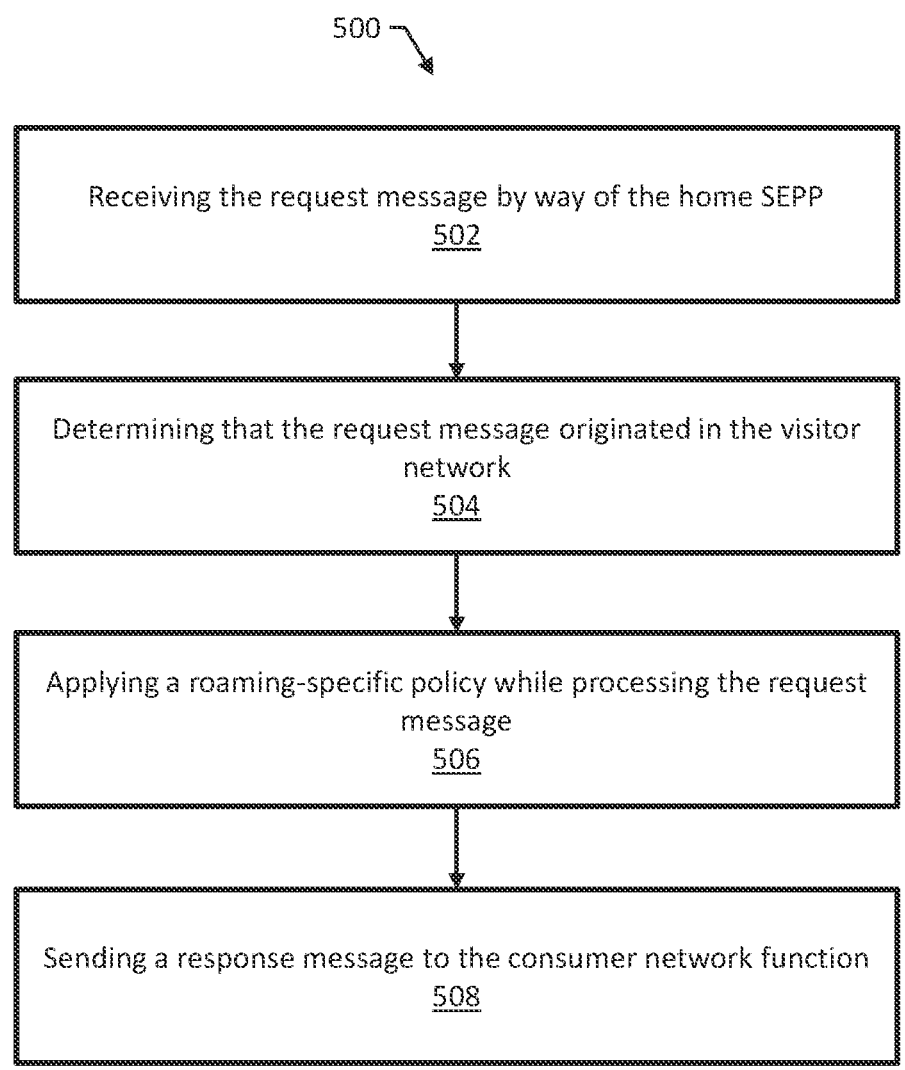
FIG. 5 is a flow diagram of an example method for identification of 5G roaming messages at network functions in a home PLMN.

FIG. 5 is a flow diagram of an example method 500 for identification of 5G roaming messages at network functions in a home PLMN. Method 500 is performed by a producer network function in the home PLMN. The producer network function can be, for example, an NRF.

Method 500 includes receiving the request message (502). The request message is typically received by way of the home SEPP, which has received the request message by way of a visitor SEPP and added a header to the request message to indicate that the request message originated in the visitor PLMN. The request message can be, for example, a NRF NFStatusSubscribe message, a NRF NFStatusUnsubscribe message, or a NRF NF Discover message.

Method 500 includes determining that the request message originated in the visitor PLMN by finding the header indicating that the request message originated in the visitor PLMN (504).

Method 500 includes applying a roaming-specific policy while processing the request message in response to determining that the request message originated in the visitor PLMN (506). Applying a roaming-specific policy while processing the request message can include applying a roaming-specific security policy or a roaming-specific observability policy.

Processing the request message can include fulfilling the request specified by the request message, e.g., subscribing or unsubscribing a consumer network function from updates provided by a NRF. Method 500 includes sending a response message to the consumer network function in the visitor PLMN by way of the home SEPP (508).

REFERENCES

The disclosure of each of the following references is incorporated herein by reference in its entirety.
1. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
2. 3$^{rd}$ Generation Partnership Project; Technical Specification Group Core Network and Terminals; 5G System; Technical Realization of Service Based Architecture; Stage 3 3GPP TS 29.500 V15.0.0 (2018-07)

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for identifying roaming messages at network functions in a home public land mobile network (PLMN), the method comprising:
   receiving, at a home security edge protection proxy (SEPP) for the home PLMN, a request message from a consumer network function in a visitor PLMN;
   adding, at the home SEPP, a header to the request message indicating that the request message originated in the visitor PLMN;
   receiving, at a producer network function in the home PLMN, the request message;
   determining, at the producer network function in the home PLMN, that the request message originated in the visitor PLMN by finding the header indicating that the request message originated in the visitor PLMN; and
   applying, at the producer network function in the home PLMN, a roaming-specific policy while processing the request message in response to determining that the request message originated in the visitor PLMN.

2. The method of claim 1, wherein receiving the request message from the consumer network function in the visitor PLMN comprises receiving the request message by way of a visitor SEPP for the visitor PLMN.

3. The method of claim 1, wherein applying a roaming-specific policy while processing the request message comprises applying a roaming-specific security policy.

4. The method of claim 1, wherein applying a roaming-specific policy while processing the request message comprises applying a roaming-specific observability policy.

5. The method of claim 1, comprising sending, at the producer network function in the home PLMN, a response message to the consumer network function in the visitor PLMN by way of the home SEPP.

6. The method of claim 1, wherein the producer network function comprises a network function repository function (NRF), and wherein the request message comprises a NRF NFStatusSubscribe message or a NRF NFStatusUnsubscribe message.

7. The method of claim 1, wherein the producer network function comprises a network function repository function (NRF), and wherein the request message comprises a NRF NF Discover message.

8. A system for identifying roaming messages at network functions in a home public land mobile network (PLMN), the system comprising:
   a home security edge protection proxy (SEPP) for the home PLMN, wherein the home SEPP is configured for:
      receiving a request message from a consumer network function in a visitor PLMN; and
      adding a header to the request message indicating that the request message originated in the visitor PLMN;
   a producer network function in the home PLMN, wherein the producer network function is configured for:
      receiving the request message;
      determining that the request message originated in the visitor PLMN by finding the header indicating that the request message originated in the visitor PLMN; and
      applying a roaming-specific policy while processing the request message in response to determining that the request message originated in the visitor PLMN.

9. The system of claim 8, wherein receiving the request message from the consumer network function in the visitor PLMN comprises receiving the request message by way of a visitor SEPP for the visitor PLMN.

10. The system of claim 8, wherein applying a roaming-specific policy while processing the request message comprises applying a roaming-specific security policy.

11. The system of claim 8, wherein applying a roaming-specific policy while processing the request message comprises applying a roaming-specific observability policy.

12. The system of claim 8, wherein the producer network function in the home PLMN is configured for sending a response message to the consumer network function in the visitor PLMN by way of the home SEPP.

13. The system of claim 8, wherein the producer network function comprises a network function repository function (NRF), and wherein the request message comprises a NRF NFStatusSubscribe message or a NRF NFStatusUnsubscribe message.

14. The system of claim 8, wherein the producer network function comprises a network function repository function (NRF), and wherein the request message comprises a NRF NF Discover message.

15. One or more non-transitory computer readable media having stored thereon executable instructions that when executed by at least one processor of a computer cause the computer to perform steps comprising:
   receiving, at a home security edge protection proxy (SEPP) for a home public land mobile network (PLMN), a request message from a consumer network function in a visitor PLMN;
   adding, at the home SEPP, a header to the request message indicating that the request message originated in the visitor PLMN;
   receiving, at a producer network function in the home PLMN, the request message;
   determining, at the producer network function in the home PLMN, that the request message originated in the visitor PLMN by finding the header indicating that the request message originated in the visitor PLMN; and
   applying, at the producer network function in the home PLMN, a roaming-specific policy while processing the request message in response to determining that the request message originated in the visitor PLMN.

16. The non-transitory computer readable media of claim 15, wherein receiving the request message from the consumer network function in the visitor PLMN comprises receiving the request message by way of a visitor SEPP for the visitor PLMN.

17. The non-transitory computer readable media of claim 15, wherein applying a roaming-specific policy while processing the request message comprises applying a roaming-specific security policy.

18. The non-transitory computer readable media of claim 15, wherein applying a roaming-specific policy while processing the request message comprises applying a roaming-specific observability policy.

19. The non-transitory computer readable media of claim 15, wherein the producer network function comprises a network function repository function (NRF), and wherein the request message comprises a NRF NFStatusSubscribe message or a NRF NFStatusUnsubscribe message.

20. The non-transitory computer readable media of claim 15, wherein the producer network function comprises a network function repository function (NRF), and wherein the request message comprises a NRF NF Discover message.

* * * * *